(12) United States Patent
Hamalainen et al.

(10) Patent No.: US 9,204,308 B2
(45) Date of Patent: Dec. 1, 2015

(54) RADIO SYSTEM CONFIGURATION

(75) Inventors: Jyri Kalervo Hamalainen, Oulu (FI);
Kari Veikko Horneman, Oulu (FI);
Markku Juha Vainikka, Kiviniemi (FI);
Vinh Van Phan, Oulu (FI); Ling Yu,
Espoo (FI)

(73) Assignee: Nokia Solutions and Networks Oy,
Espoo (FI)

( * ) Notice: Subject to any disclaimer, the term of this patent is extended or adjusted under 35 U.S.C. 154(b) by 574 days.

(21) Appl. No.: 12/809,116

(22) PCT Filed: Dec. 16, 2008

(86) PCT No.: PCT/EP2008/067597
§ 371 (c)(1),
(2), (4) Date: Sep. 8, 2010

(87) PCT Pub. No.: WO2009/077519
PCT Pub. Date: Jun. 25, 2009

(65) Prior Publication Data
US 2011/0045836 A1    Feb. 24, 2011

(30) Foreign Application Priority Data

Dec. 19, 2007  (FI) .................................. 20 075937

(51) Int. Cl.
*H04W 16/14* (2009.01)
*H04W 16/32* (2009.01)
*H04W 28/16* (2009.01)
*H04W 72/00* (2009.01)
*H04W 88/08* (2009.01)

(52) U.S. Cl.
CPC .............. *H04W 16/14* (2013.01); *H04W 16/32* (2013.01); *H04W 28/16* (2013.01); *H04W 72/00* (2013.01); *H04W 88/08* (2013.01)

(58) Field of Classification Search
CPC ..... H04W 16/00; H04W 16/02; H04W 16/14; H04W 16/16; H04W 88/00; H04W 88/08; H04W 72/00; H04W 72/04; H04W 28/16
USPC ................ 455/450, 452.1, 446; 370/331, 338
See application file for complete search history.

(56) References Cited

U.S. PATENT DOCUMENTS

| | | | | |
|---|---|---|---|---|
| 6,052,364 | A * | 4/2000 | Chalmers et al. .............. | 370/312 |
| 6,101,176 | A * | 8/2000 | Honkasalo et al. ........... | 370/335 |
| 7,069,577 | B2 * | 6/2006 | Geile et al. ..................... | 725/106 |
| 8,761,059 | B2 * | 6/2014 | Kim et al. ...................... | 370/281 |
| 2007/0258417 | A1 | 11/2007 | Harvey et al. ................. | 370/338 |
| 2008/0085720 | A1 * | 4/2008 | Hirano et al. ............... | 455/452.1 |
| 2008/0139113 | A1 * | 6/2008 | Ho et al. ............................ | 455/7 |
| 2009/0073929 | A1 * | 3/2009 | Malladi et al. ................ | 370/329 |
| 2010/0136989 | A1 * | 6/2010 | Westerberg et al. .......... | 455/450 |
| 2012/0115526 | A1 * | 5/2012 | Ogawa et al. ................. | 455/509 |

FOREIGN PATENT DOCUMENTS

WO    WO-96/31075 A1    10/1996

* cited by examiner

*Primary Examiner* — Nizar Sivji
(74) *Attorney, Agent, or Firm* — Harrington & Smith

(57) ABSTRACT

A method, in which a bandwidth of a carrier frequency is allocated to subbands and one or more of the subbands is assigned to a radio network element to be used in radio communication between the radio network element and user equipment having a radio connection with the radio network element.

26 Claims, 4 Drawing Sheets

RADIO SYSTEM CONFIGURATION

FIELD

The invention relates to configuring a radio system.

BACKGROUND

High-level concepts and requirements for LTE (Long Term Evolution) Home eNBs have been discussed and set in 3GPP ($3^{rd}$ Generation Partnership Project). In one scenario, Home eNBs may be deployed and operated in a carrier dedicated to their kind of eNB types or radios in a coordinated or an uncoordinated fashion. In another scenario, Home eNBs may be deployed and operated in the same carrier as that of macro eNBs, which are providing services for a wide area. In this case, Home eNBs and macro eNBs may share the same carrier and the local area coverage of Home eNBs may fall into the coverage of a wide-area macro eNB.

However, the deployment of home eNBs in a large number over a certain local area in homes or office buildings presents many technical challenges. These include interference problems between the home eNBs and coordination possibilities for efficient flexible spectrum use, for instance.

SUMMARY

It is an object of the present invention to provide an improved way of accommodating home eNBs to existing radio systems. In an aspect, there is provided an apparatus, comprising a transceiver for providing a radio cell for radio communication with user equipment, which radio cell resides within a radio cell of an overlay radio network. The transceiver is configured to use one or more subbands of a bandwidth of a carrier frequency.

In another aspect, there is provided an apparatus, comprising a transceiver providing a radio cell of a radio system, wherein the radio cell incorporates one or more radio cells of an other radio network. A radio cell of the other radio network is configured to use one or more subbands of a bandwidth of a carrier frequency for radio communication.

In still another aspect, there is provided an apparatus comprising a transceiver capable of having a radio connection with a network element of an overlay radio network, and with a network element of a second radio network operating within a coverage area of the overlay radio network. The transceiver is configured to use one or more subbands of a bandwidth of a carrier frequency in radio communication with a network element of the second radio network.

In still another aspect, there is provided a method, comprising allocating bandwidth of a carrier frequency into subbands, and assigning one or more of the subbands for a radio network element to be used in radio communication between the radio network element and user equipment having a radio connection with the radio network element.

DRAWINGS

Figure 1:
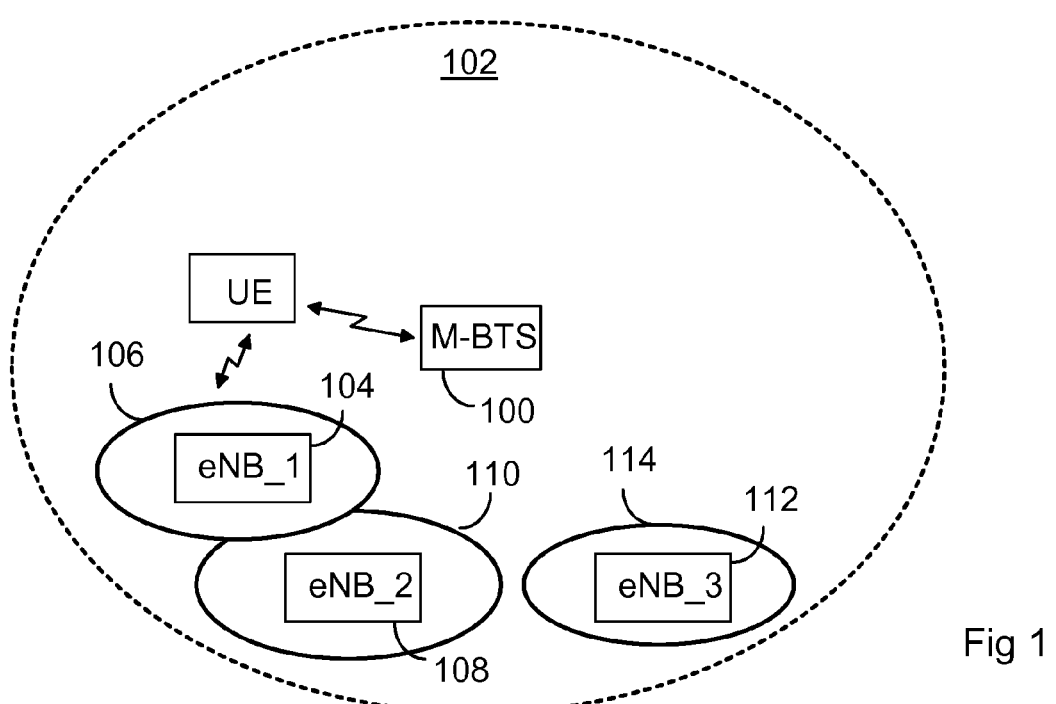
Figure 2:
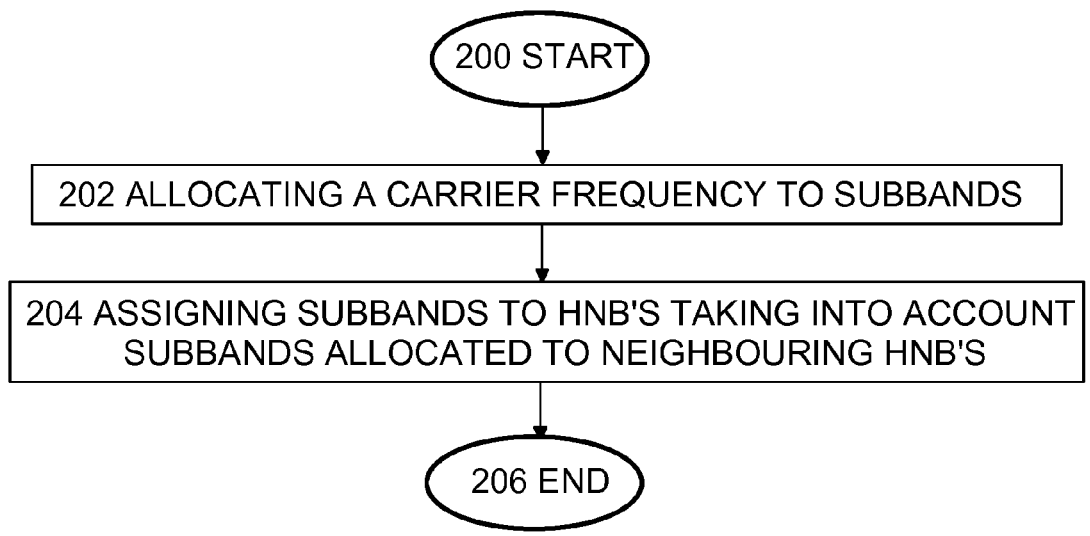
Figure 3:
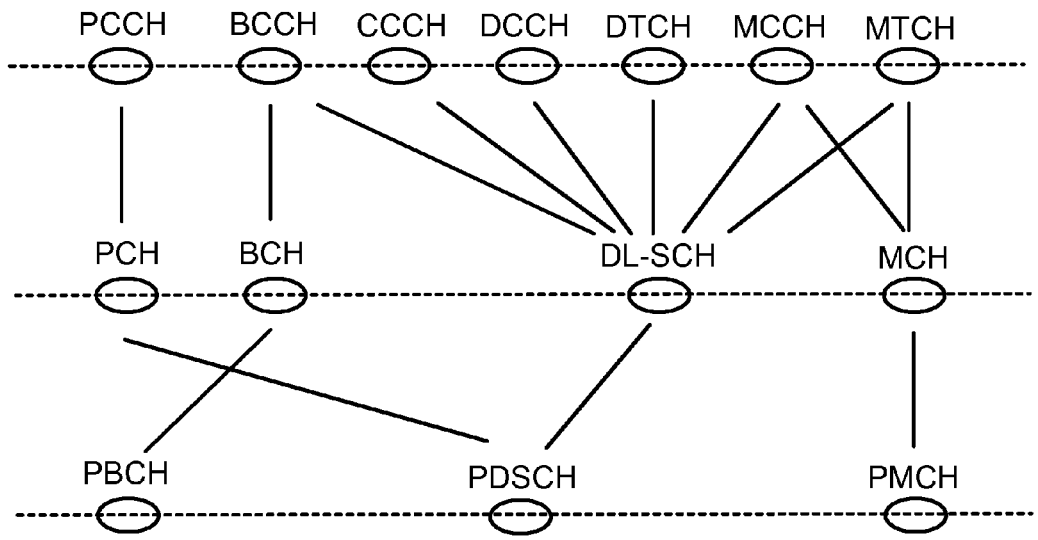
Figure 4:
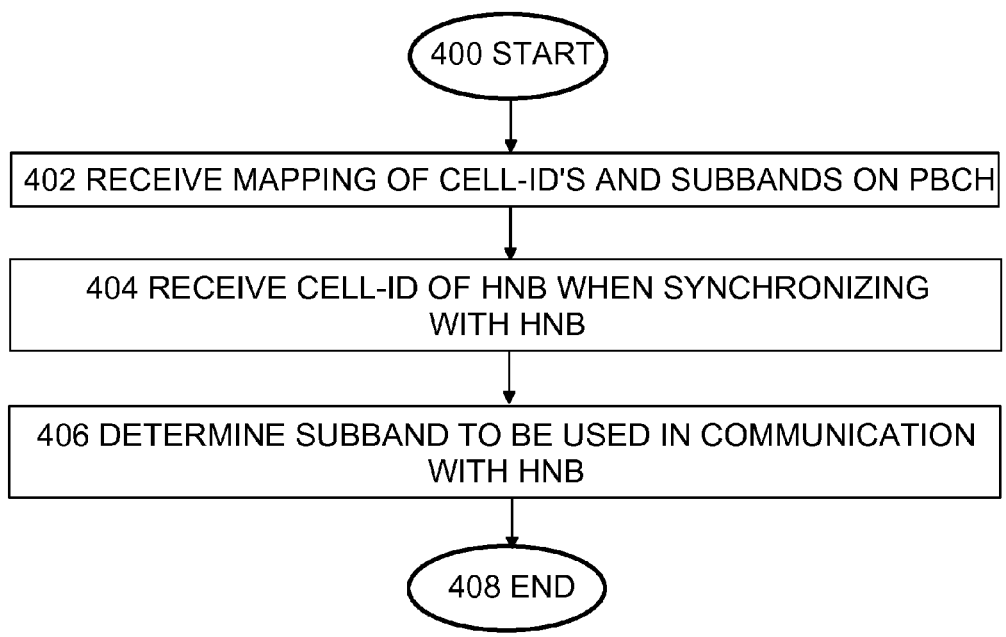
Figure 5:
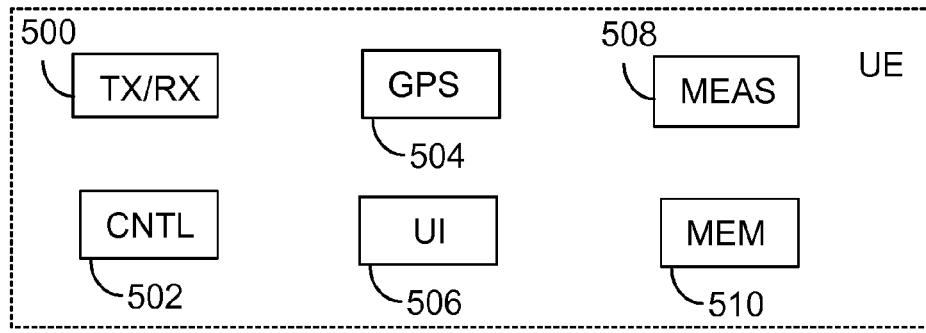
Figure 6:
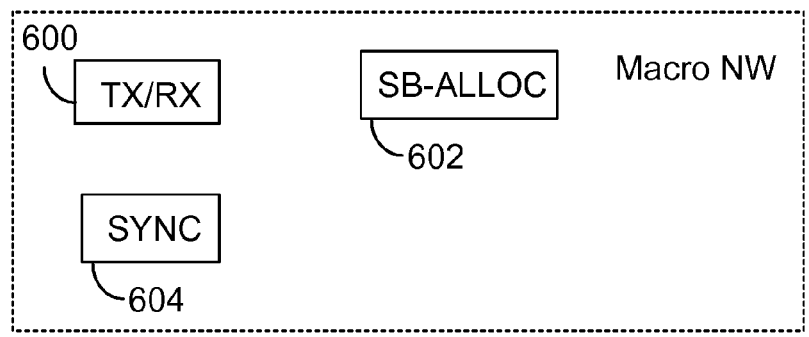
Figure 7:
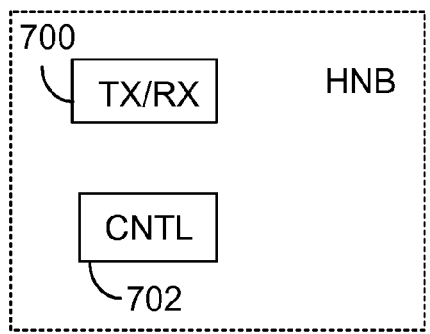
Figure 8:
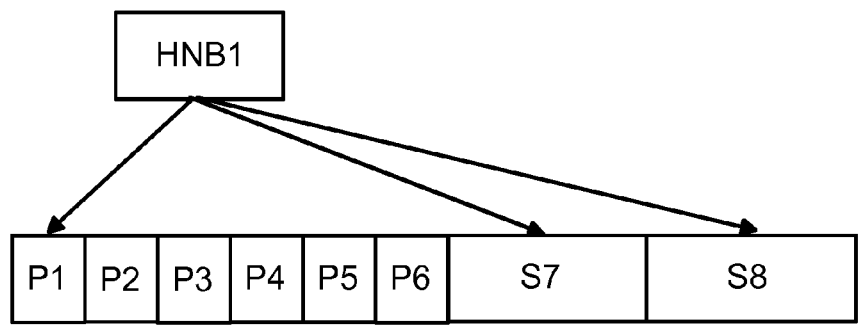
Figure 9:
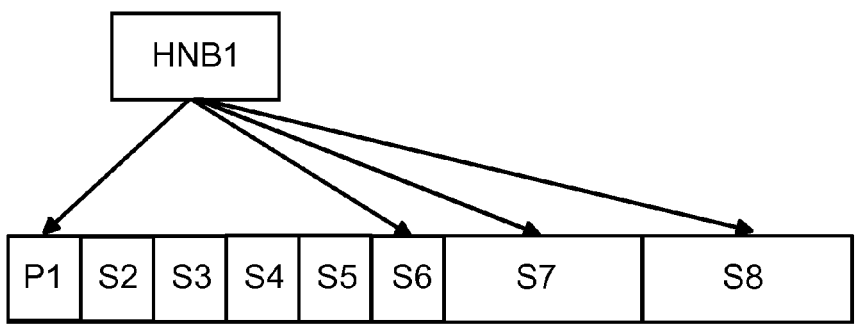
Figure 9:
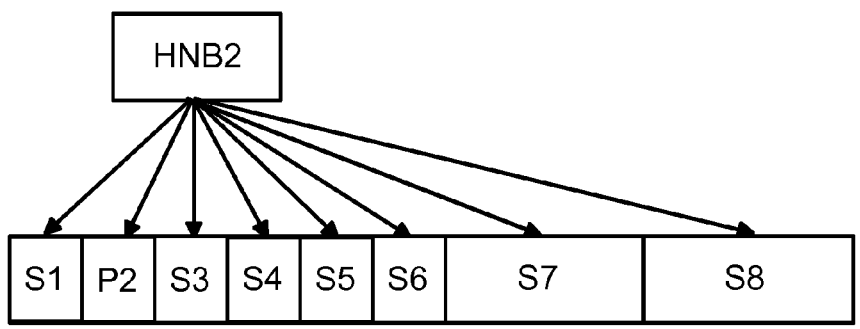

In the following, the invention will be described in greater detail by means of preferred embodiments with reference to the accompanying drawings, in which FIG. 1 shows a communication network on a high level;
FIG. 2 shows an embodiment of a method;
FIG. 3 shows downlink channel mapping in E-UTRAN;
FIG. 4 shows one embodiment of a method;
FIG. 5 shows an embodiment of user equipment;
FIG. 6 shows an embodiment of a macro network;
FIG. 7 shows an embodiment of a home NB;
FIG. 8 shows an embodiment of subband allocation; and
FIG. 9 shows another embodiment of subband allocation.

DESCRIPTION OF SOME EMBODIMENTS

FIG. 1 illustrates operation of a telecommunication system to which the invention may be applied on a general level. The telecommunication system includes a first radio system including base stations 104, 108 and 112 having respective radio cells 106, 110 and 114. The base stations of the first radio system may be so-called home eNB's (HNB). A second radio system, a macro network having a base station 100 and radio cell 102, overlaps the radio cells of the HNB's. The home eNB's may be employed in homes or offices, for instance. Besides being horizontally next to each other as shown in FIG. 1, the cells/nodes may also be vertically positioned with respect to each other, such as in the case of block of flats.

In a first embodiment, the first radio system and the second radio system operate on the same carrier frequency. It may be assumed that also the nodes of the first radio system, that is the HNB's, are capable of operating over the total bandwidth of the overlay macro network (second network). In a second embodiment, the HNB's operate on a carrier frequency different from that of the second radio system. Both the first and second radio systems may be radio systems called long-term evolution (LTE) of a UMTS (Universal Mobile Telecommunication System) standardized by the $3^{rd}$ Generation Partnership Project. The radio systems may employ an E-UTRAN (Evolved Universal Terrestrial Radio Access Network) radio protocol. In LTE, orthogonal frequency division multiple access (OFDMA) is utilized for downlink communications and single-carrier frequency division multiple access (SC-FDMA) for uplink communications.

The macro base station 100 is connected to the other parts of the macro network providing also access to the Internet and other networks. The HNB's may be controlled by the macro network or a server specific to the HNB radio system.

FIG. 2 shows an embodiment of a method of configuring radio network elements such as home eNBs. It may be considered that the HNB's form a radio system/network, although there may be very little or no coordination between the nodes. Alternatively, coordination for the HNB's may be provided by an MME/S-GW (Mobile Management Entity/Serving-Gateway) server over a so-called S1 interface. The HNB's may also be capable of exchanging information with each other over a so-called X2 interface. All the HNB's in this context use the same carrier frequency.

A macro network overlaps the HNB cells, that is, the HNB cells belong to the coverage area of the macro network. The macro network and the home network may operate on the same carrier frequency, or a dedicated carrier frequency may be provided for the HNB cells. The bandwidth of the carrier frequency assigned to the HNB network may be divided into subbands.

In E-UTRAN, a transmitted signal in each time slot may be described as a resource grid of a number of subcarriers and OFDM symbols. The resource grid includes a number of resource elements, each uniquely identified by an index pair including indices in frequency and time domains. In the context of the present invention, a subband may denote a subset of all possible resource elements.

As an example, a case where a 10 MHz carrier bandwidth has been allocated to the home eNB network may be considered. The bandwidth may be allocated to subbands as shown by step 202. The above-mentioned 10 MHz bandwidth may be divided into 8 subbands numbered from 1 to 8 and each thus having a bandwidth of 1.25 MHz. Instead of being of equal size, the subbands may also be of different sizes. Furthermore, the subbands may be mutually exclusive or partly overlapping. Furthermore, a subband may be continuous or distributed, that is it may include several distributed portions.

The subbands may be divided into primary and secondary subbands. Each home eNB may be allocated to one of the primary subbands. In the above example, subbands 1 to 6 may be primary subbands, and subbands 7 to 8 may be secondary subbands.

The assignment of home eNB's may be carried out on the basis of physical Cell ID of the node, for instance. As an example, home eNB's having an assigned physical Cell ID in the range of 1 to 20 may be put into subband 1, eNB's having a Cell ID between 21 to 40 may be put into subband 2, and so forth. For the transmission of control channel data, a home eNB allocated to the first subband is thus to use its primary subband 1, whereas for user data transmission one or more of subbands 1, 7 or 8 may be applied.

As shown by 204, in the assignment of the HNB's to subbands, it may be taken into account that neighbouring HNB's are assigned to different subbands. In this way, co-channel interference may be reduced between HNB's. Referring to FIG. 1, eNB_1 might be assigned to the primary subband 1 thus having a cell ID between 1 and 20. As eNB_2 is a neighbouring HNB to eNB_1, it should be assigned to a primary subband different from eNB_1. eNB_2 might be assigned to subband 2 and have a cell ID between 21 to 40, for instance.

More than one Home eNB may be assigned to the same primary sub-band. As the assignment may take the location of the home eNB's into account so that two neighboring home eNB's are assigned to different primary sub-bands, cell identities (ID's) may be reused for cells that do not reside next to each other.

FIG. 8 shows one example of subband allocation for a home eNB, HNB1. A bandwidth of a carrier frequency is divided into 8 subbands, of which P1 to P6 denote primary subbands, and S7, S8 denote secondary subbands. The primary subbands may be used for transmission of control channels, whereas the secondary subbands may be used for user data transmission. As the figure shows, subbands may have different bandwidth. In the example of FIG. 8, the secondary subbands have greater bandwidth than the primary subbands.

FIG. 9 shows another embodiment of subband allocation to two home eNB's, HNB1 and HNB2. The division of carrier frequency bandwidth corresponds to that of FIG. 8. In FIG. 9, HNB1 has been allocated to the primary subband P1 and HNB2 has been allocated to primary subband P2. If the nodes are neighbouring home eNB's, their operation on the control channels do not interfere with each other as they are allocated to different subbands. With regard to secondary subbands, in the example of FIG. 9, HNB1 may use subbands S6 to S8, whereas HNB2 may use subbands S1 and S3 to S8. HNB1 and HNB2 thus share use of subbands S6 to S8 for user data transmission. Coordination may be provided from the network so that traffic of HNB1 and HNB2 do not interfere on the shared subbands.

As an example of information transfer channels in a radio system, FIG. 3 shows a downlink channel structure of E-UTRAN. Channels on the highest horizontal line illustrate the logical channels of the system, channels in the middle are transport channels, and physical channels are shown on the lowest level.

As to the logical channel layer, PCCH (Paging Control Channel) transfers paging information, BCCH (Broadcast Control Channel) broadcasts system control information, CCCH (Common Control Channel) transfers control information between UE and network, DCCH (Dedicated Control Channel) transfers point-to-point dedicated control information between UE and network, DTCH (Dedicated Traffic Channel) transfers point-to-point dedicated user information between UE and network, MCCH (Multicast Control Channel) trans-fers point-to-multipoint MBMS (Multimedia Broadcast Multicast Service) control information from the network to UE and MTCH (Multicast Traffic Channel) transfers point-to-multipoint MBMS (Multimedia Broadcast Multicast Service) traffic information from the network to UE.

The logical channels are mapped to transport channels as shown by FIG. 3. As can be seen, BCCH, for example, may be mapped either to BCH (Broadcast Channel) or DL-SCH (Downlink Shared Channel). In the transport channel layer, PCH stands for Paging Channel, and MCH for Multicast Channel.

Downlink physical channels of E-UTRAN include PBCH (Physical Broadcast Channel), PDSCH (Physical Downlink Shared Channel), and PMCH (Physical Multicast Channel).

As the channel mapping shows, broadcast information from a cell (logical channel BCCH) may end up either in PBCH or PDSCH on the physical layer.

FIG. 4 shows one embodiment of a method. The embodiment highlights a situation where UE receives information on how to use an HNB from the macro network. In 402, UE receives information on mapping of physical cell identities and primary subbands on PBCH of the macro cell. We may assume that this situation occurs whenever UE resides outside any HNB. This may also be the case when UE is turned on at home, that is in the coverage area of both the macro and HNB cell.

In an embodiment, PBCH transmission occurs in an SFN (Single Frequency Network) mode having the same synchronized content and trans-port format from the HNBs and also the macro NB in case of shared carrier. Synchronization coordination may be provided by an MME (Mobility Management Entity) or a macro eNB, for instance.

The contents of the PBCH may include information specific to the primary subband allocated to a certain physical cell ID range of deployed Home eNB's.

Step 404 in FIG. 4 may be triggered by UE detecting that a broadcast signal level provided by the HNB exceeds a predetermined threshold value. In another embodiment, UE may be equipped with a GPS receiver, and use of HNB may be triggered by the location of UE. That is, UE may have prestored coordinates of the coverage area of the HNB, and when UE detects on the basis of the GPS signal that UE is at home, use of or synchronizing with the HNB may be started. In still another embodiment, starting use of the HNB may be carried out manually. That is, UE may have a stored user profile including subband information on the HNB, and when the user profile is manually taken into use, UE connects to the HNB.

Returning to the case, when starting of the HNB is based on measurements, a triggering condition for the use of the HNB may occur when UE moves from outside the coverage area of an HNB into the coverage area of the HNB. In this case, UE begins to synchronize with the HNB. In this process, UE receives 404 the physical cell identity of the HNB. Based on the mapping of the cell ID's and subbands and the knowledge of the cell ID of the HNB, UE is able to determine 406 the primary subband allocated to the HNB. After that, UE is able to receive PDCCH of the HNB and receive further access control and system information. This further information may, for instance, include information on which subbands may be used by UE for user data transmission. Thus, cell-specific common control channels, such as PBCH (Physical Broadcast Channel), PDDCH (Physical Downlink Control Channel), PRACH (Physical Random Access Channel) may be transmitted on the primary subband. The home eNB's may share one or more secondary subbands in a coordinated or uncoordinated manner for user data transmission.

In another embodiment, the overlaid macro eNB may broadcast home eNB related information, such as subband allocation for cell ID's in its dynamic BCH transmitted on PDSCH (Physical Downlink Shared Channel). This information may be specified in the form of new system information block(s) (SIB) and/or new information element(s) of existing SIB(s) provided in the E-UTRAN. In this case UE, upon accessing its home eNB utilizes the system information received on the PDSCH of the overlaid macro cell to select and access the local HNB.

With regard to PDCCH, transmission in the home eNB may be allocated in the primary subband to different positions in time and/or frequency within a sub-frame different from those having been specified e.g. for the overlaid macro cell. Thereby, interference between the home eNB's and the overlay macro network may be reduced.

Although above the reference has been made to downlink channels, uplink channels may be handled in a similar manner, that is the control channels may be conveyed in the primary frequency band and the user data channels in the secondary subbands.

The secondary sub-bands may be coordinated by the MME or the Macro eNB of the overlaid network may coordinate the use of secondary subbands among Horne eNBs located and operating in its control area. This assignment may be semi-static or dynamic during active operation of Horne eNBs. This can be realized by using a signalling procedure over S1 in the case of MME or X2 in the case of a macro eNB responsible for coordination.

FIG. 5 shows an embodiment of user equipment (UE). User equipment may reside in a mobile phone or a laptop computer, for instance. UE includes a transceiver module, which provides the user equipment with bi-directional communication links. The communication links may include E-UTRAN radio links to a macro network or to a home eNB. FIG. 5 also shows a control unit, which is capable of controlling the device and executing various functionalities at the device, such as those shown in the embodiments of the methods, with the help of other entities of UE.

These functionalities include the following, for instance. A GPS receiver 504 may receive a GPS signal and forward it to a control unit 502. The control unit may compare the location pointed by the received GPS signal with the location stored in a memory 510 of the device. The stored location may be the location of the home of the user owning the device, where an HNB has been installed. The control unit may also receive via a transceiver 500 broadcast information from a macro network indicating subband allocation to cell identities. The control unit may also receive via the transceiver the cell identity of the home eNB, and determine the subband allocated to the home eNB. UE may also include a measuring unit, which may measure the signal strength of the home eNB and forward the measurement results to the control unit for determination whether or not the device is within the coverage area of the home node. With regard to the actual radio operation, the control unit includes a functionality enabling UE to operate in the total bandwidth provided by the macro network, and also one or more of the subbands provided by the HNB.

FIG. 6 shows an embodiment of a macro network showing only the relevant portions in this context. The macro network includes a transmitter/receiver unit 600 for providing terminals within the coverage area of the macro network with radio links. The macro network also includes a subband allocation module, which may provide the subband allocation with respective to the cell identities. This information may then be transmitted via the transmitter/receiver module on the PBCH or PDCCH. The macro network may also include a synchronization module 604 for providing synchronization between the macro cell and HNB PBCH transmission in SFN mode.

FIG. 7 shows an embodiment of a home eNB with regard to features relevant in this context. The HNB includes a transmitter/receiver unit, which may provide a plurality of interfaces, such as E-UTRAN communication towards a mobile subscriber and S1, X2 interfaces for communication with other network elements of the home network.

The HNB also includes a control unit 702, which controls the operation of the HNB. This controlling may include receiving synchronization information from a macro network for transmitting a PBCH synchronously with a PBCH of the macro network. For radio transmission, the home NB may use the subband stored in it, or ordered by a macro network.

The functionalities in user equipment, macro network, and home NB may be implemented by way of software, hardware or a combination thereof.

It will be obvious to a person skilled in the art that as technology advances, the inventive concept can be implemented in various ways. The invention and its embodiments are not limited to the examples described above but may vary within the scope of the claims.

The invention claimed is:
1. An apparatus, comprising:
a transceiver for providing a radio cell for radio communication with user equipment, wherein the radio cell communicates with the user equipment in a coverage area that is overlapped by a macro coverage area of an existing macro network,
one or more processors; and
one or more memories including computer program code,
the one or more memories and the computer program code configured, with the one or more processors, to cause the apparatus to perform at least the following:
configure the transceiver to use a plurality of frequency subbands of a bandwidth of a carrier frequency allocated for use by the radio cell for radio communication with the user equipment in the macro coverage area, wherein at least one of the subbands of the plurality of frequency subbands allocated for use by the radio cell is a primary subband used for transmission of control channel information and at least one other subbands of said plurality of frequency subbands are secondary subbands allocated for use by the radio cell for transmission of user data, and wherein the primary and secondary subbands are allocated to avoid interference with other devices communicating in the macro coverage area on the carrier frequency allocated for use for radio communication with the user equipment, and wherein the primary subband and the secondary subbands are different than frequency subbands in use by the existing macro network;
wherein the transceiver is configured to transmit a primary broadcast channel in a single frequency network mode with a primary broadcast channel of the overlay radio network;

wherein the radio cell of the radio network is configured to transmit on a broadcast channel information on the subband allocation to radio network elements of the another radio network; and wherein the radio cell of the radio network is configured to transmit as information on sub band allocation a mapping of cell identities and subbands.

2. An apparatus as claimed in claim 1, wherein the one or more subbands used for radio communication share the carrier frequency with other subbands of the carrier frequency.

3. An apparatus as claimed in claim 1, wherein the transceiver is configured to use the primary subband different from a primary subband assigned to a neighbouring apparatus.

4. An apparatus as claimed in claim 1, wherein the transceiver is configured to share use of one or more subbands for radio communication with one or more apparatuses.

5. An apparatus as claimed in claim 1, wherein the transceiver is configured to transmit a primary broadcast channel in a single frequency network mode with a primary broadcast channel of the overlay radio network.

6. An apparatus as claimed in claim 1, wherein the apparatus is a home base station employing an E-UTRAN radio protocol and operating within an overlay network employing an E-UTRAN radio protocol.

7. An apparatus, comprising:
one or more processors; and
one or more memories including computer program code, the one or more memories and the computer program code configured, with the one or more processors, to cause the apparatus to perform at least the following:
configure a radio cell of a radio network using a plurality of first frequency subbands of a bandwidth of a carrier frequency for radio communication and configuring a radio cell of another radio network to use at least one second frequency subband of a bandwidth of the carrier frequency for radio communication wherein at least one subband of the plurality of frequency subbands is a primary subband used for transmission of control channel information and other subbands are secondary subbands used for transmission of user data, wherein the primary and secondary subbands are allocated to avoid interference with other devices communicating in the macro coverage area on the carrier frequency allocated for use for radio communication with the user equipment, and wherein the radio cell of the radio network incorporates the radio cell of the another radio network, and wherein the primary subband and the secondary subbands are different than frequency subbands in use by the existing macro network;
wherein the transceiver is configured to transmit a primary broadcast channel in a single frequency network mode with a primary broadcast channel of the overlay radio network;
wherein the radio cell of the radio network is configured to transmit on a broadcast channel information on the subband allocation to radio network elements of the another radio network; and
wherein the radio cell of the radio network is configured to transmit as information on sub band allocation a mapping of cell identities and subbands.

8. An apparatus as claimed in claim 7, wherein the radio cell of the radio network is configured to transmit on a broadcast channel information on the subband allocation to radio network elements of the another radio network.

9. An apparatus as claimed in claim 8, wherein the radio cell of the radio network is configured to transmit as information on subband allocation a mapping of cell identities and subbands.

10. An apparatus as claimed in claim 7, wherein the radio cell of the radio network is configured to transmit a primary broadcast channel in a single frequency network mode with a primary broadcast channel of the another radio network.

11. An apparatus as claimed in claim 7, wherein the radio cell of the radio network is configured to transmit information on the subband allocation to the another radio network on a dynamic broadcast channel.

12. An apparatus, comprising:
a transceiver capable of having a radio connection with a network element of an overlay radio network, and with a network element of a second radio network operating within a coverage area of the overlay radio network, one or more processors; and
one or more memories including computer program code, the one or more memories and the computer program code configured, with the one or more processors, to cause the apparatus to perform at least the following:
configure the transceiver to use a plurality of frequency subbands of a bandwidth of a carrier frequency in radio communication with the network element of the second radio network, wherein at least one subband of the plurality of frequency subbands is a primary subband allocated for use by the transceiver for transmission of control channel information and other subbands of the plurality of frequency subbands of the bandwidth are secondary subbands allocated for use by the transceiver for transmission of user data, wherein the primary and secondary subbands are allocated to avoid interference with other devices communicating in the coverage area of the overlay radio network on the carrier frequency allocated for use for radio communication with the user equipment, and wherein the primary subband and the secondary subbands are different than frequency subbands in use by the existing macro network;
wherein the transceiver is configured to transmit a primary broadcast channel in a single frequency network mode with a primary broadcast channel of the overlay radio network;
wherein the radio cell of the radio network is configured to transmit on a broadcast channel information on the subband allocation to radio network elements of the another radio network; and
wherein the radio cell of the radio network is configured to transmit as information on sub band allocation a mapping of cell identities and subbands.

13. An apparatus as claimed in claim 12, wherein the transceiver is configured to use the same carrier frequency in radio communication in the overlay radio network and in the second radio network.

14. An apparatus as claimed in claim 12, wherein the transceiver is configured to share one or more subbands with one or more apparatuses for user data transmission.

15. An apparatus as claimed in claim 12, wherein the transceiver is configured to receive a mapping of cell identities and sub-band allocation on a broadcast channel.

16. An apparatus as claimed in claim 12, wherein the transceiver is configured to receive a cell identity of a radio network element of the second radio network while synchronizing with the radio network element.

17. A method, comprising:
allocating a bandwidth of a carrier frequency used for radio communication in a coverage area to a plurality of frequency subbands;
assigning the plurality of frequency subbands to a radio network element to be used in radio communication between the radio network element and user equipment having a radio connection with the radio network element, wherein at least one subband of the plurality of frequency subbands is a primary subband used for transmission of control channel information and other subbands of the plurality of frequency subbands are secondary subbands used for transmission of user data, wherein the primary and secondary subbands are allocated to avoid interference with other devices communicating in the coverage area on the carrier frequency allocated for use for radio communication with the user equipment, and wherein the primary subband and the secondary subbands are different than frequency subbands in use by the existing macro network;
wherein the transceiver is configured to transmit a primary broadcast channel in a single frequency network mode with a primary broadcast channel of the overlay radio network;
wherein the radio cell of the radio network is configured to transmit on a broadcast channel information on the subband allocation to radio network elements of the another radio network; and
wherein the radio cell of the radio network is configured to transmit as information on sub band allocation a mapping of cell identities and subbands.

18. A method as claimed in claim 17, further comprising assigning different primary subbands to neighbouring radio network elements.

19. A method as claimed in claim 17, further comprising assigning one or more of the subbands as secondary subbands shareable for radio communication of one or more radio network elements.

20. A method as claimed in claim 17, wherein the radio network element belongs to a first radio network, and wherein radio cells provided by the radio network element of the first radio network are within a coverage area of radio cells provided by radio network elements of a second radio network.

21. A method as claimed in claim 20, wherein the first radio network and the second radio network operate on a same carrier frequency for communicating with the user equipment.

22. A method as claimed in claim 21, wherein the second radio system is configured to broadcast information on subband allocation to radio network elements of the first radio system.

23. A method as claimed in claim 21, wherein a primary broadcast channel of the first radio network and a primary broadcast channel of the second radio network are transmitted in a single frequency network mode.

24. A method as claimed in claim 22, wherein the primary broadcast channel of the first radio network includes information on the subband allocation to cell identities of the radio network elements of the first radio network.

25. A method as claimed in claim 22, wherein the second radio network transmits information on the subband allocation to the first radio network on a dynamic broadcast channel of the second radio network.

26. An apparatus as claimed in claim 7, wherein the control channel information is used to avoid interference with devices communicating in a coverage area of the radio cell of the radio network.

* * * * *